US012008677B2

(12) United States Patent
Alla et al.

(10) Patent No.: US 12,008,677 B2
(45) Date of Patent: Jun. 11, 2024

(54) COMPATIBLE COMPRESSION FOR DIFFERENT TYPES OF IMAGE VIEWS

(71) Applicant: QUALCOMM Incorporated, San Diego, CA (US)

(72) Inventors: Srihari Babu Alla, San Diego, CA (US); Tao Wang, Sunnyvale, CA (US); Andrew Evan Gruber, Arlington, MA (US); Matthew Netsch, Westminster, MA (US); Richard Hammerstone, Tyngsboro, MA (US); Thomas Edwin Frisinger, Shrewsbury, MA (US)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 17/655,358

(22) Filed: Mar. 17, 2022

(65) Prior Publication Data
US 2023/0298123 A1 Sep. 21, 2023

(51) Int. Cl.
*G06T 1/20* (2006.01)
*H04N 19/182* (2014.01)

(52) U.S. Cl.
CPC ............. *G06T 1/20* (2013.01); *H04N 19/182* (2014.11)

(58) Field of Classification Search
CPC ................................ G06T 1/20; H04N 19/182
USPC .............. 345/522; 348/E13.001; 375/E7.095
See application file for complete search history.

(56) References Cited

U.S. PATENT DOCUMENTS

| 9,633,451 | B2 | 4/2017 | Huang | |
|---|---|---|---|---|
| 11,218,676 | B2* | 1/2022 | Abbas | ................ H04N 23/6812 |
| 2002/0012471 | A1* | 1/2002 | Nayyar | .................. H04N 19/21 |
| | | | | 375/E7.095 |
| 2011/0216162 | A1* | 9/2011 | Filippini | ................ H04N 11/02 |
| | | | | 348/E13.001 |
| 2017/0276578 | A1* | 9/2017 | Vaughan | .................. G01N 1/36 |
| 2017/0345125 | A1* | 11/2017 | Golas | ...................... G06T 11/40 |
| 2018/0089091 | A1 | 3/2018 | Akenine-Moller et al. | |
| 2018/0213255 | A1* | 7/2018 | Siver | .................... H04N 21/816 |
| 2023/0067069 | A1* | 3/2023 | Ghatage | ............... G06V 30/416 |

OTHER PUBLICATIONS

International Search Report and Written Opinion—PCT/US2023/014523—ISA/EPO—May 26, 2023.

* cited by examiner

*Primary Examiner* — Prabodh M Dharia
(74) *Attorney, Agent, or Firm* — Procopio, Cory, Hargreaves & Savitch (57) ABSTRACT

This disclosure provides systems, devices, apparatus, and methods, including computer programs encoded on storage media, for compatible compression for different types of image views. A graphics processor may select a first common format of a plurality of common formats for at least one image based on at least one of application data or first metadata associated with the at least one image. The graphics processor may encode the at least one image based on the selected first common format for the at least one image. The graphics processor may select a second common format for the at least one image based on second metadata of the at least one image. The second common format may be identical to the first common format. The graphics processor may decode the at least one image based on the selected second common format for the at least one image.

30 Claims, 7 Drawing Sheets

COMPATIBLE COMPRESSION FOR DIFFERENT TYPES OF IMAGE VIEWS

TECHNICAL FIELD

The present disclosure relates generally to processing systems, and more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current techniques may not address compression compatibility when mutability between compatible formats is specified for an image. There is a need for improved image storage techniques.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may select a first common format of a plurality of common formats for at least one image based on at least one of application data associated with the at least one image or first metadata associated with the at least one image. The at least one image may correspond to an uncompressed format. The application data or the first metadata may correspond to a number of bits per pixel for the at least one image. The apparatus may encode the at least one image based on the selected first common format for the at least one image. The apparatus may select a second common format of the plurality of common formats for the at least one image based on second metadata associated with the at least one image. The second common format may be identical to the first common format. The apparatus may decode the at least one image based on the selected second common format for the at least one image.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

Based on a graphics application programming interface (API), an application may request to store an image based on a first format, and may indicate a mutability specification for the image. Based on the mutability specification, the application may request to read the stored image based on a second format that is different from, yet compatible with, the first format. For example, data compression (e.g., universal bandwidth compression (UBWC), fast clear, or solid color compression, etc.) may not be applied to the image stored based on the first format due to different compression techniques associated with different formats. If an image with a mutability specification is stored based on the first format with data encoding/compression applied, the stored compressed image may not be properly decompressed/decoded when the request to read the image is based on the second format because of the different compression techniques that may be associated with the first format and the second format, even though the first format and the second format may be compatible formats.

According to one or more aspects, a common (or canonical) format associated with a group of compatible formats may be used for image storage when an application requests to store an image based on a first format in the group of compatible formats and indicates a mutability specification for the image. Data encoding/compression (e.g., UBWC) may be applied to the image stored based on the common format. When the application requests to read the image based on a second format in the group of compatible formats, the stored compressed image may be decompressed/decoded based on the common format, and may be reinterpreted (or cast) based on the second format. Accordingly, data compression may be applied even when mutability is specified. Bandwidth and storage savings may be achieved.

Figure 1:
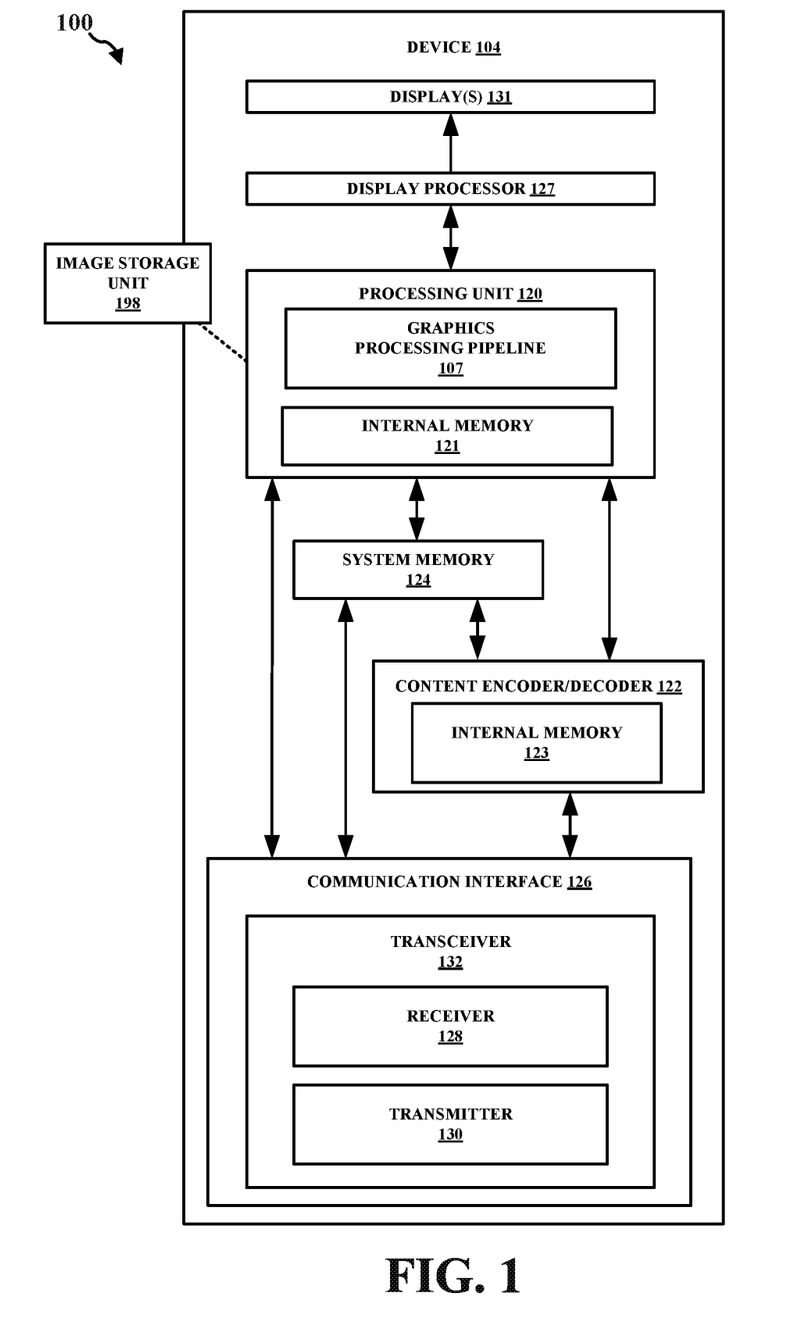
FIG. 1 is a block diagram that illustrates an example content generation system in accordance with one or more techniques of this disclosure.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include any number of additional components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include an image storage unit 198 configured to select a first common format of a plurality of common formats for at least one image based on at least one of application data associated with the at least one image or first metadata associated with the at least one image. The at least one image may correspond to an uncompressed format. The application data or the first metadata may correspond to a number of bits per pixel for the at least one image. The image storage unit 198 may be configured to encode the at least one image based on the selected first common format for the at least one image. The image storage unit 198 may be configured to select a second common format of the plurality of common formats for the at least one image based on second metadata associated with the at least one image. The second common format may be identical to the first common format. The image storage unit 198 may be configured to decode the at least one image based on the selected second common format for the at least one image. Although the following description may be focused on graphics processing, the concepts described herein may be applicable to other similar processing techniques.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
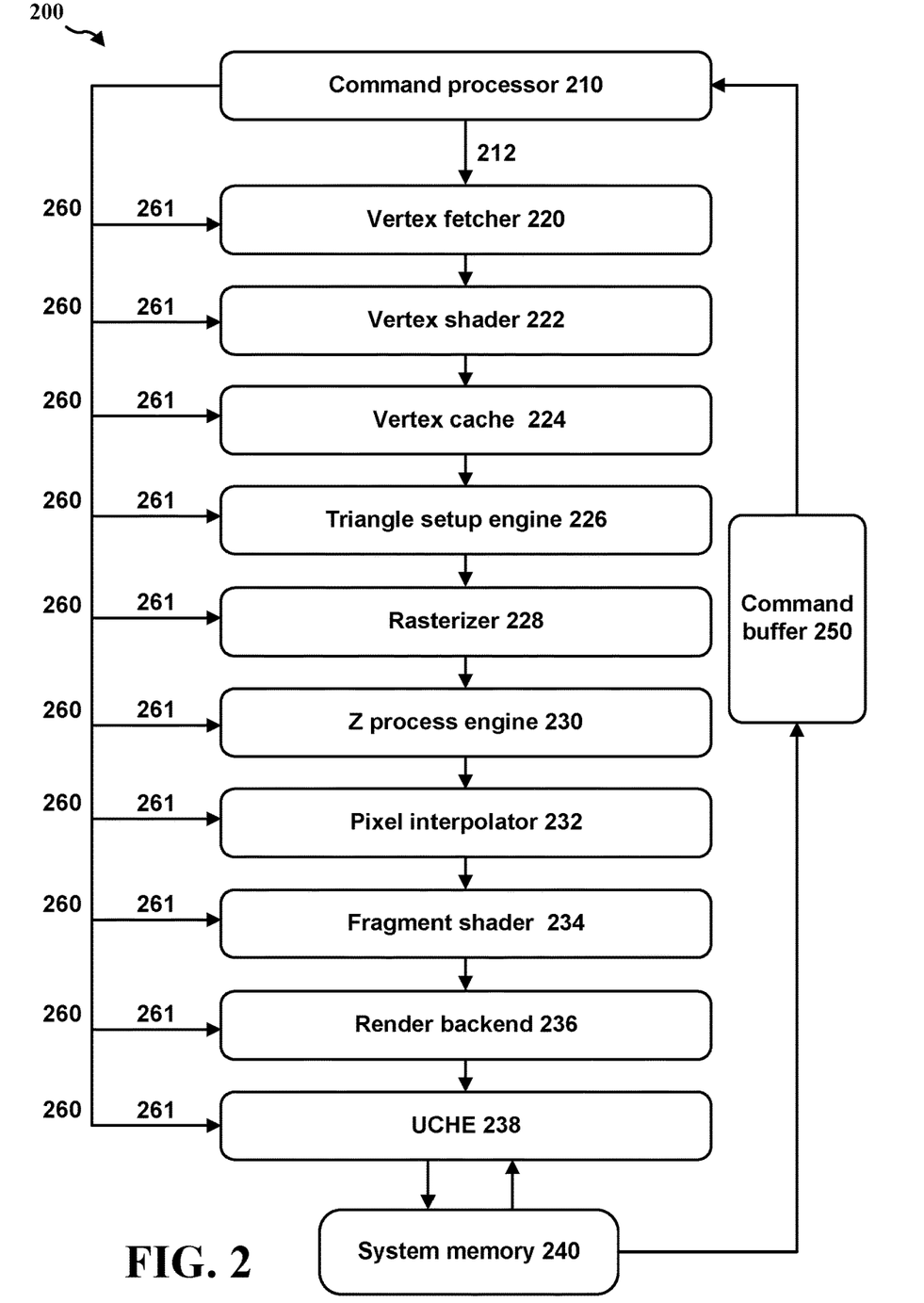
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

Graphics processing, image processing or image compression may utilize different types of image formats. An image may be encoded/compressed, stored, or decompressed/decoded based on an image format. In different examples, the image may be an output from the render backend 236 and/or stored in the UCHE 238 or the system memory 240. In further examples, the image may be obtained from a camera, an image signal processor (ISP), or other storage or network. An image format may indicate the components including the component order and the number of bits for each component associated with each pixel of the image. For example, for an RGB10A2 format, each pixel may be associated with a 10-bit red (R) component, a 10-bit green (G) component, a 10-bit blue (B) component, and a 2-bit alpha (A) value (which may indicate opacity), in that order, for a total of 32 bits. Therefore, the RGB10A2 format may be a 32 bits-per-pixel format. As another example, for an RGBA8 format, each pixel may be associated with an 8-bit red component, an 8-bit green component, an 8-bit blue component, and an 8-bit alpha value, in that order, also for a total of 32 bits. Therefore, the RGBA8 format may be a 32 bits-per-pixel format as well. In one or more aspects, based on the mutability specification, image formats associated with a same bits-per-pixel number may belong in a same group of image formats, and may be compatible with each other. Within a same group of compatible formats, when mutability is specified, an image may be encoded/compressed and stored based on a first format, and may be decoded/decompressed and read based on a second format (e.g., an image view based on the second format). If the first format and the second format are different formats, a reinterpretation (or casting) process may be utilized.

An image format may further indicate a data type. For example, an RGBA8_unorm format may be an RGBA8 format in an unsigned normalized integer (e.g., an integer representing a floating point number) data type. Additional data types may include float (a floating number data type), sint (a signed integer data type), snorm (a signed normalized integer data type), and uint (an unsigned integer data type), etc. Therefore, for example, R8G8B8A8_unorm (or RGBA8_unorm) and R32_uint may be compatible formats with a same 32 bits-per-pixel number, R5G6B5_unorm and R16_float may be compatible formats with a same 16 bits-per-pixel number, and R8G8B8A8_unorm (or RGBA8_unorm) and R10G10B10A2_unorm (or RGB10A2_unorm) may be compatible formats with a same 32 bits-per-pixel number.

Certain types of compression, e.g., UBWC, may compress graphical buffers, such as GPU, video, and/or camera buffers. For instance, UBWC may work on a per-tile basis with a UBWC tile including a predetermined number of pixels (e.g., 4, 8, or more pixels). Additionally, macrotiling, which may be a pixel swizzle technique (e.g., a technique based on reordering of vector information in the pixels), may include arranging data into blocks with multiple rectangular sub-blocks. Macrotiling may be used to improve cache locality for pixels with vertical adjacency and improve multi-channel memory usage.

Figure 3:
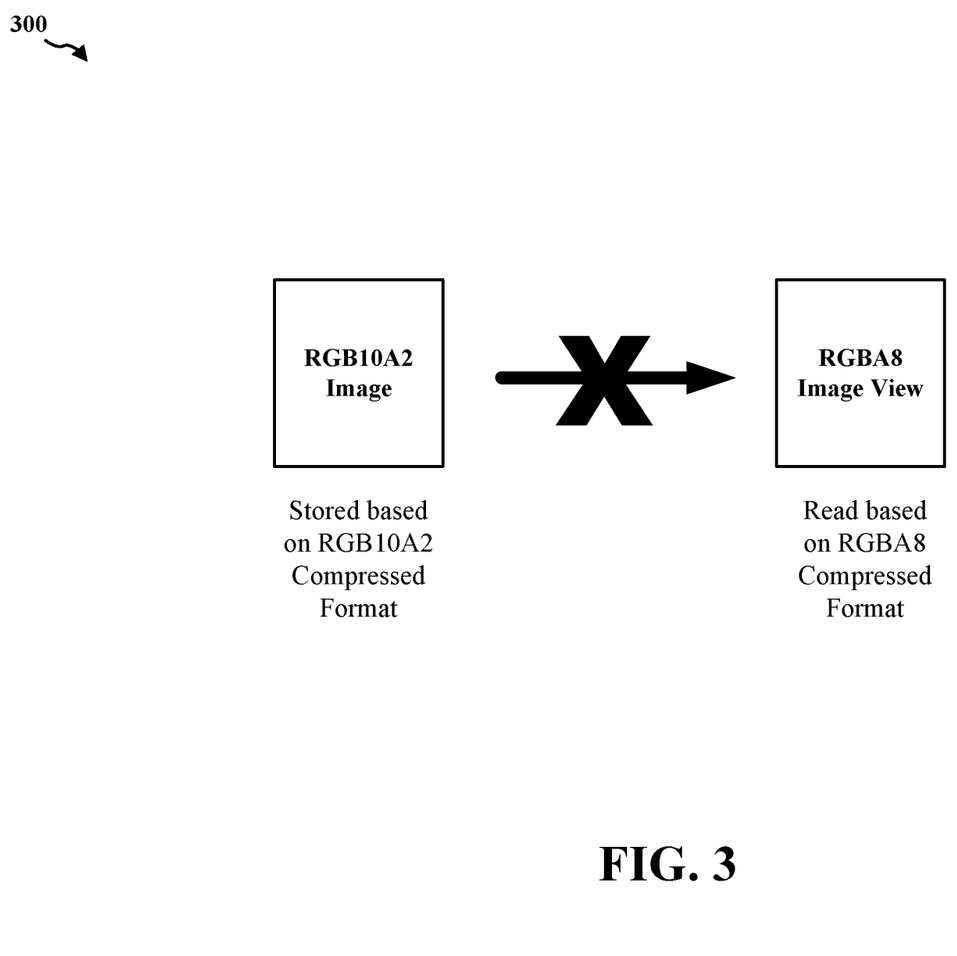
FIG. 3 is a diagram illustrating incompatibility between image mutability and data compression.

FIG. 3 is a diagram 300 illustrating incompatibility between image mutability and data compression. An application may request to store an image based on the RGB10A2 format, and may indicate a mutability specification for the image. Based on the mutability specification, the application may request to read the stored image based on the RGBA8 format. The RGB10A2 format and the RGBA8 format may be compatible with each other because both are associated with 32 bits-per-pixel. Accordingly, the read request may be valid based on the mutability specification. According to this example, if data compression (e.g., UBWC, fast clear, or solid color compression, etc.) is applied to the image stored based on the RGB10A2 format, the stored compressed image may not be properly decompressed/decoded when the request to read the image is based on the RGBA8 format due to different compression techniques that may be associated with the RGB10A2 format and the RGBA8 format, even though the RGB10A2 format and the RGBA8 format are compatible formats based on the mutability specification.

In particular, the different compression techniques associated with different formats may be illustrated using the following example aspects. For example, the fast clear definitions (e.g., definitions encoded in the metadata and used to represent a constant color for the tile) may be different between unorm/snorm/uint/sint and float data types. For example, for a 16-bit component, "1" may represent 0xffff for unorm/snorm/uint/sint, and may represent 0x3c00 for float. In some instances, different macrotiling layouts/address definitions (e.g., macrotiling-16A (32x4) and macrotiling-16B (16x8)) may be used for the different formats with the same bits-per-pixel number. For instance, different UBWC approaches may be applied for different formats. For example, with 32 bits-per-pixel, each of the RGBA8, RGB10A2, R11G11B10, or R16G16 formats may be associated with a respective different UBWC approach. For example, a canonical component order may be used in macrotiling or UBWC, and the macrotiling or UBWC technique may not distinguish between, e.g., RGBA8 and BGRA8 formats. Further, for example, the RGBA8 and RGB10A2 formats may be associated with different solid color compression definitions.

Figure 4A:
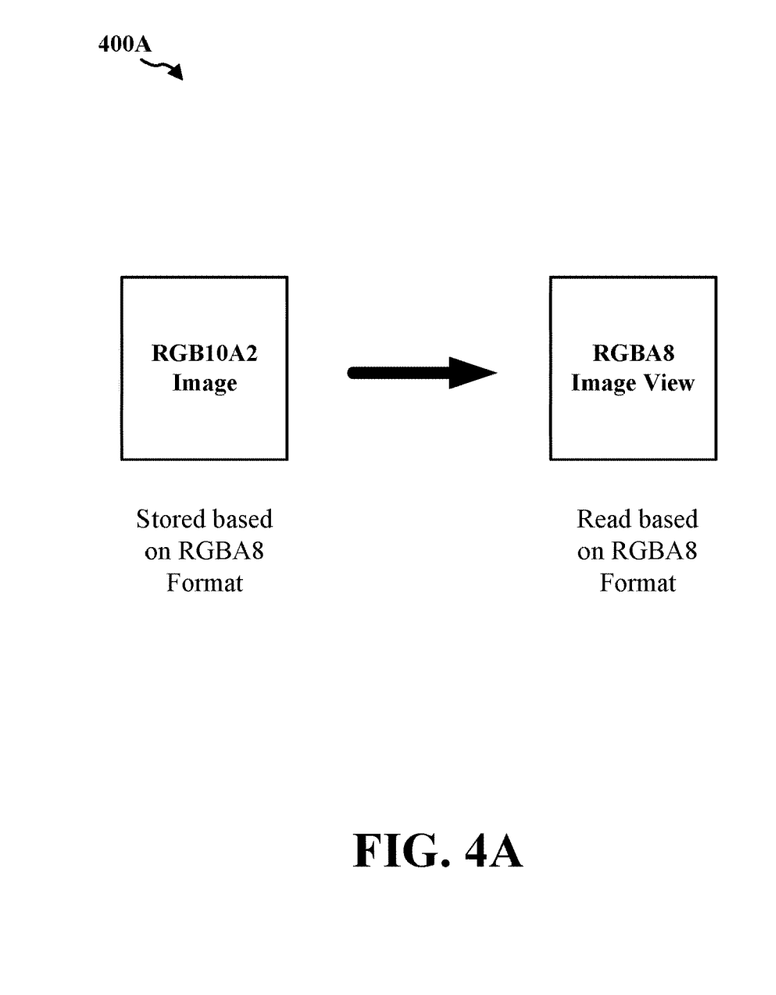
FIGS. 4A and 4B are a diagrams illustrating example image data storage based on a common format according to one or more aspects.
Figure 4B:
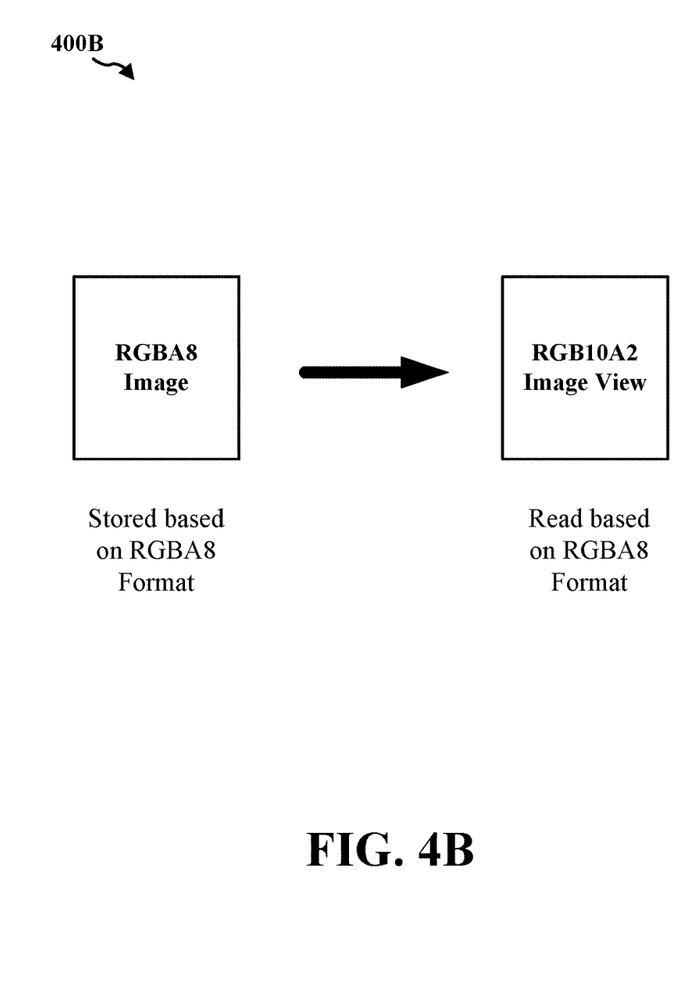

FIGS. 4A and 4B are a diagrams 400A and 400B illustrating example image data storage based on a common format according to one or more aspects. A common (or canonical) format may be defined for each group of compatible formats, and may be used when a mutability specification is indicated. Each group of compatible formats may be associated with a same bits-per-pixel number. For example, for all 16 bits-per-pixel formats, the common R16_unorm format may be used for storage, macrotiling (e.g., 16A macrotiling), UBWC compression/decompression and/or the fast clear definition. For all 32 bits-per-pixel formats, the common RGBA8_unorm format may be used for storage, UBWC compression/decompression, the fast clear definition, and/or the solid color compression. For all 64 bits-per-pixel formats, the common RGBA16_float format may be used for storage, UBWC compression/decompression, and/or the fast clear definition. For all 128 bits-per-pixel formats, the common RGBA32_float format may be used for storage, UBWC compression/decompression, and/or the fast clear definition. In one aspect, mutability specification may not be supported for 8 bits-per-pixel formats due to GPU hardware limits. Accordingly, for example, the software (e.g., the GPU driver) may set a register bit at the GPU to command the GPU to encode/compress and decode/decompress the image based on the common format. The GPU may apply data compression when encoding image.

In some aspects, using the common format for compression, the compression ratio may decrease a certain amount, e.g., between 10% and 30%, compared to compression based on the different formats. However, the formats associated with a same bits-per-pixel number may be rendered compatible with each other based on using the common format for compression, and accordingly, compression may be applied when mutability specification is indicated. In contrast, where a common format is not used for compression, compression may not be applied at all when mutability specification is indicated.

Accordingly, as shown in FIG. 4A, an application may request to store an image based on the RGB10A2 format, and may indicate a mutability specification for the image. Because the RGB10A2 format is a 32 bits-per-pixel format, and based on the mutability specification, a GPU may select the common RGBA8_unorm format for all 32 bits-per-pixel formats, and may use the common format for the encoding/compressing and storage (e.g., to a memory such as a graphics memory (GMEM) or a color cache) of the image. The image based on the RGB10A2 format may be reinterpreted based on the common RGBA8_unorm format for encoding/compressing and storage. Data compression (e.g., UWBC, fast clear, and/or solid color compression, etc.) may be applied based on the common RGBA8_unorm format. Based on the mutability specification, the application may request to read the stored image based on the RGBA8 format (e.g., an RGBA8 format image view), which may also be a 32 bits-per-pixel format, and may be compatible with the RGB10A2 format. Accordingly, the GPU may select the common RGBA8_unorm format for all 32 bits-per-pixel formats, and may use the common format for decompressing/decoding the image. Because a common format is used for encoding/compression and storage, and for decompression/decoding and reading, the image may be properly decompressed/decoded.

Further, as shown in FIG. 4B, an application may request to store an image based on the RGBA8 format, and may indicate a mutability specification for the image. Because the RGBA8 format is a 32 bits-per-pixel format, and based on the mutability specification, the GPU may select the common RGBA8_unorm format for all 32 bits-per-pixel formats, and may use the common format for the encoding/compressing and storage (e.g., to a memory such as a GMEM or a color cache) of the image. Data compression (e.g., UWBC, fast clear, and/or solid color compression, etc.) may be applied based on the common RGBA8_unorm format. Based on the mutability specification, the application may request to read the stored image based on the RGB10A2 format (e.g., an RGB10A2 format image view), which may also be a 32 bits-per-pixel format, and may be compatible with the RGBA8 format. Accordingly, the GPU may select the common RGBA8_unorm format for all 32 bits-per-pixel, and may use the common format for decompressing/decoding the image. The decoded image based on the RGBA8_unorm format may be reinterpreted based on the RGB10A2 format as requested by the application. The image may then be transmitted to the application based on the RGB10A2 format. Because a common format is used for encoding/compression and storage, and for decompression/decoding and reading, the image may be properly decompressed/decoded.

As described above, if the requested format associated with a request to store an image or a request to read an image is different from the common format for the group of compatible formats, a reinterpretation process may be used to change the image format to or from the common format.

Figure 5:
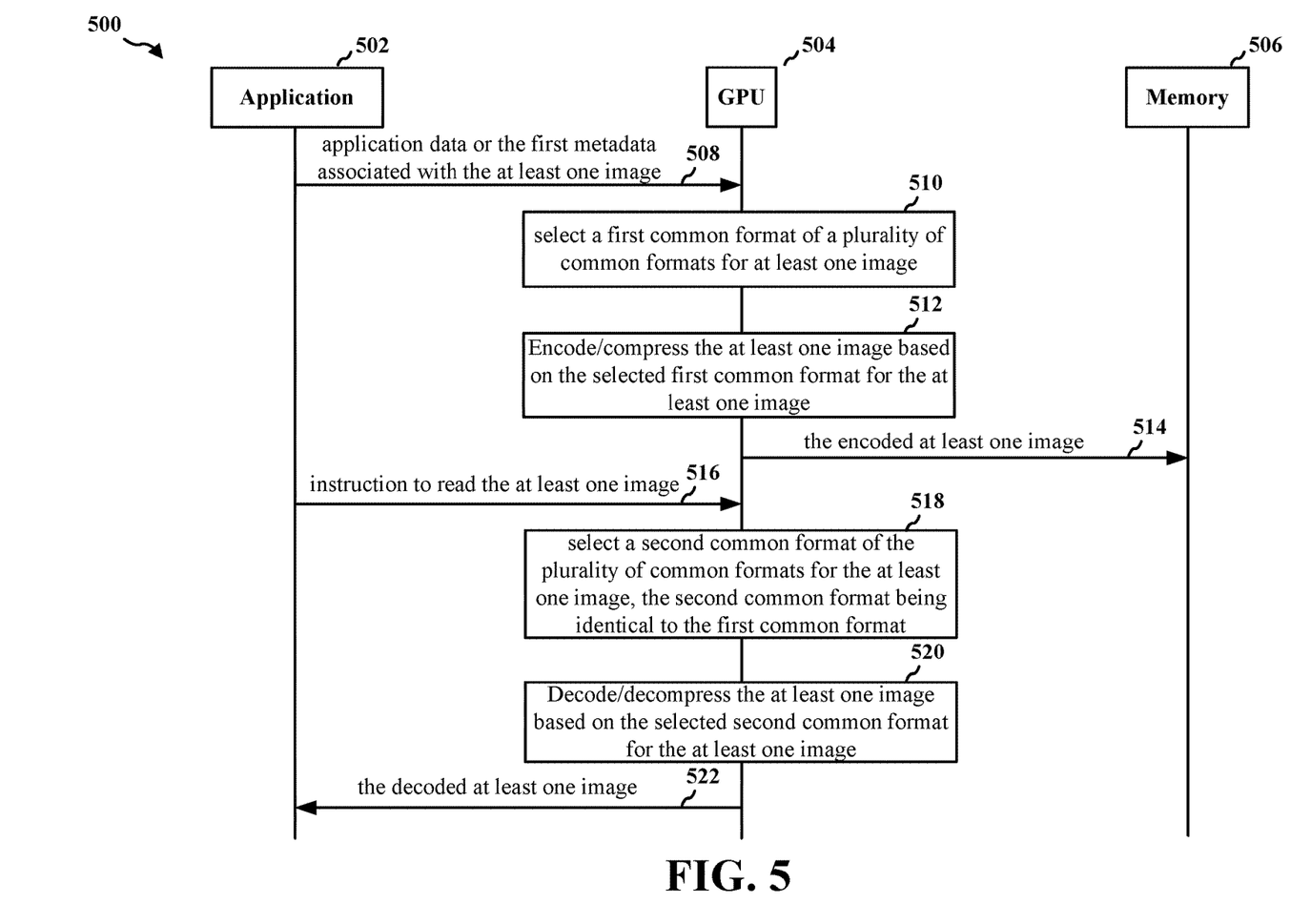
FIG. 5 is a call flow diagram illustrating example communications between an application, a GPU, and a memory in accordance with one or more techniques of this disclosure.

FIG. 5 is a call flow diagram 500 illustrating example communications between an application 502, a GPU 504, and a memory 506 in accordance with one or more techniques of this disclosure. At 508, the GPU 504 may receive application data associated with at least one image and first metadata associated with the at least one image. The at least one image may be received from the application 502 (e.g., from a camera or an ISP) or generated (rendered) by the GPU 504 based on draw data received from the application 502. The first metadata may indicate a third image format, and may include a mutability specification indication.

At 510, the GPU 504 may select a first common format of a plurality of common formats for at least one image based on at least one of application data associated with the at least one image or first metadata associated with the at least one image. The at least one image may correspond to an uncompressed format. The application data or the first metadata (e.g., the third image format) may correspond to a number of bits per pixel for the at least one image. The first common format may be compatible with the third image format. In one configuration, each pixel may be associated with multiple samples (e.g., supersampling for the purpose of multisample anti-aliasing (MSAA)). A pixel associated with multiple samples may be referred to as a super pixel.

At 512, the GPU 504 may encode the at least one image based on the selected first common format for the at least one image. Encoding the at least one image may include applying data compression (e.g., UBWC, fast clear, or solid color compression, etc.).

At 514, the GPU 504 may store, to the memory 516 (e.g., a GMEM or a color cache), the encoded at least one image based on the first common format.

At 516, the GPU 504 may receive, from an application 502, an instruction to read the at least one image associated with second metadata associated with the at least one image. The second metadata may include a fourth image format requested by the application 502.

At 518, the GPU 504 may select a second common format of the plurality of common formats for the at least one image based on the second metadata associated with the at least one image. The second common format may be compatible with the fourth image format. Further, the second common format may be identical to the first common format.

At 520, the GPU 504 may decode the at least one image based on the selected second common format for the at least one image. Decoding the at least one image may include applying data decompression.

At 522, the GPU 504 may transmit, to an application 502, the decoded at least one image. The GPU 504 may transmit the decoded at least one image to the application based on the requested fourth image format associated with the second metadata (e.g., using an interpretation process).

Figure 6:
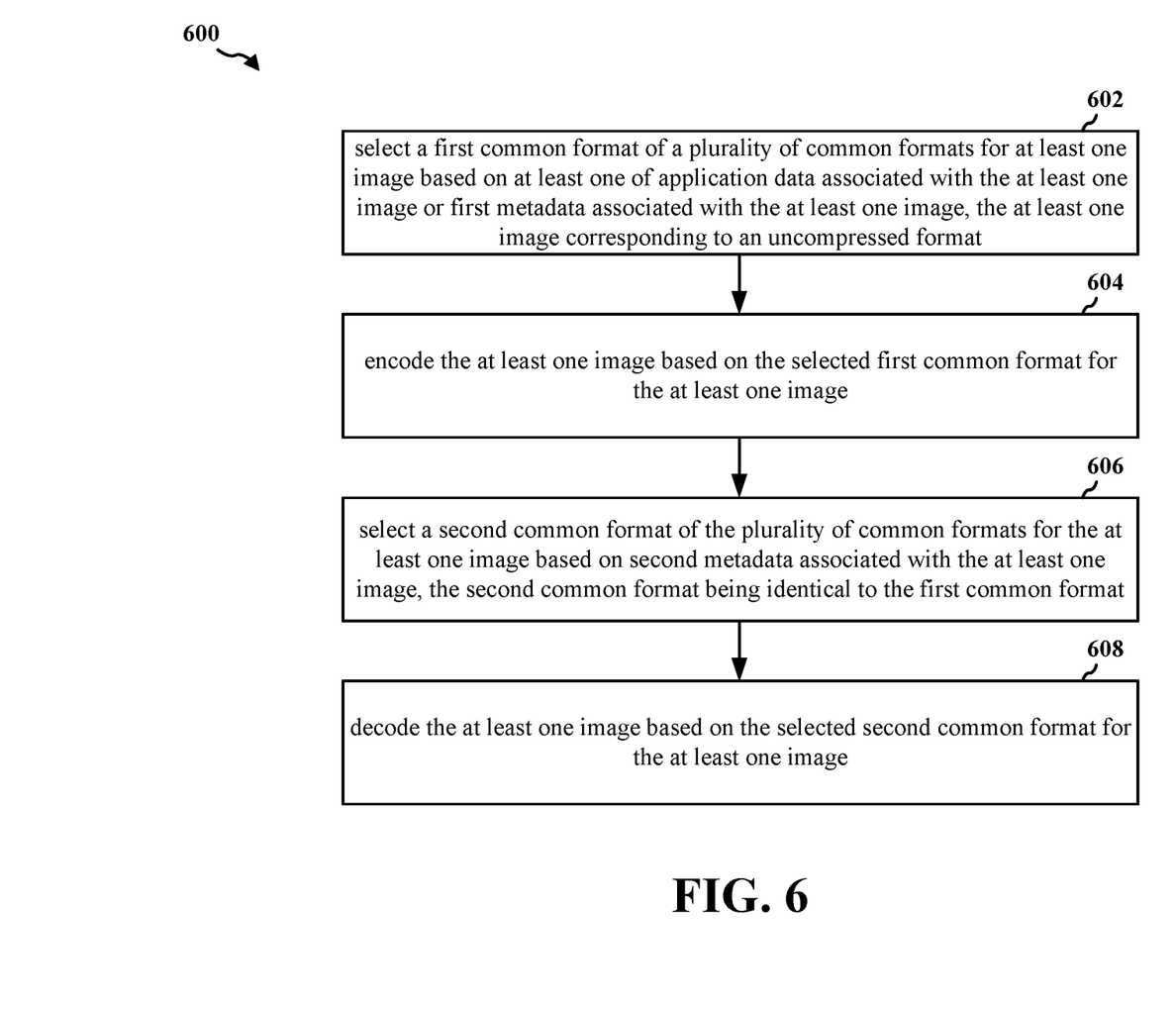
FIG. 6 is a flowchart of an example method of graphics processing in accordance with one or more techniques of this disclosure.

FIG. 6 is a flowchart 600 of an example method of graphics processing in accordance with one or more techniques of this disclosure. The method may be performed by an apparatus, such as an apparatus for graphics processing, a GPU, a CPU, a wireless communication device, and the like, as used in connection with the aspects of FIGS. 1, 2, 4A, 4B, and 5.

At 602, the apparatus may select a first common format of a plurality of common formats for at least one image based on at least one of application data associated with the at least one image or first metadata associated with the at least one image. The at least one image may correspond to an uncompressed format. The application data or the first metadata may correspond to a number of bits per pixel for the at least one image. For example, referring to FIG. 5, at 510, the GPU 504 may select a first common format of a plurality of common formats for at least one image based on at least one of application data associated with the at least one image or first metadata associated with the at least one image. Further, the processing unit 120 in FIG. 1 may perform the operation 602.

At 604, the apparatus may encode the at least one image based on the selected first common format for the at least one image. For example, referring to FIG. 5, at 512, the GPU 504 may encode the at least one image based on the selected first common format for the at least one image. Further, the processing unit 120 in FIG. 1 may perform the operation 604.

At 606, the apparatus may select a second common format of the plurality of common formats for the at least one image based on second metadata associated with the at least one image. The second common format may be identical to the first common format. For example, referring to FIG. 5, at 518, the GPU 504 may select a second common format of the plurality of common formats for the at least one image based on second metadata associated with the at least one image. Further, the processing unit 120 in FIG. 1 may perform the operation 606.

At 608, the apparatus may decode the at least one image based on the selected second common format for the at least one image. For example, referring to FIG. 5, at 520, the GPU 504 may decode the at least one image based on the selected second common format for the at least one image. Further, the processing unit 120 in FIG. 1 may perform the operation 608.

Figure 7:
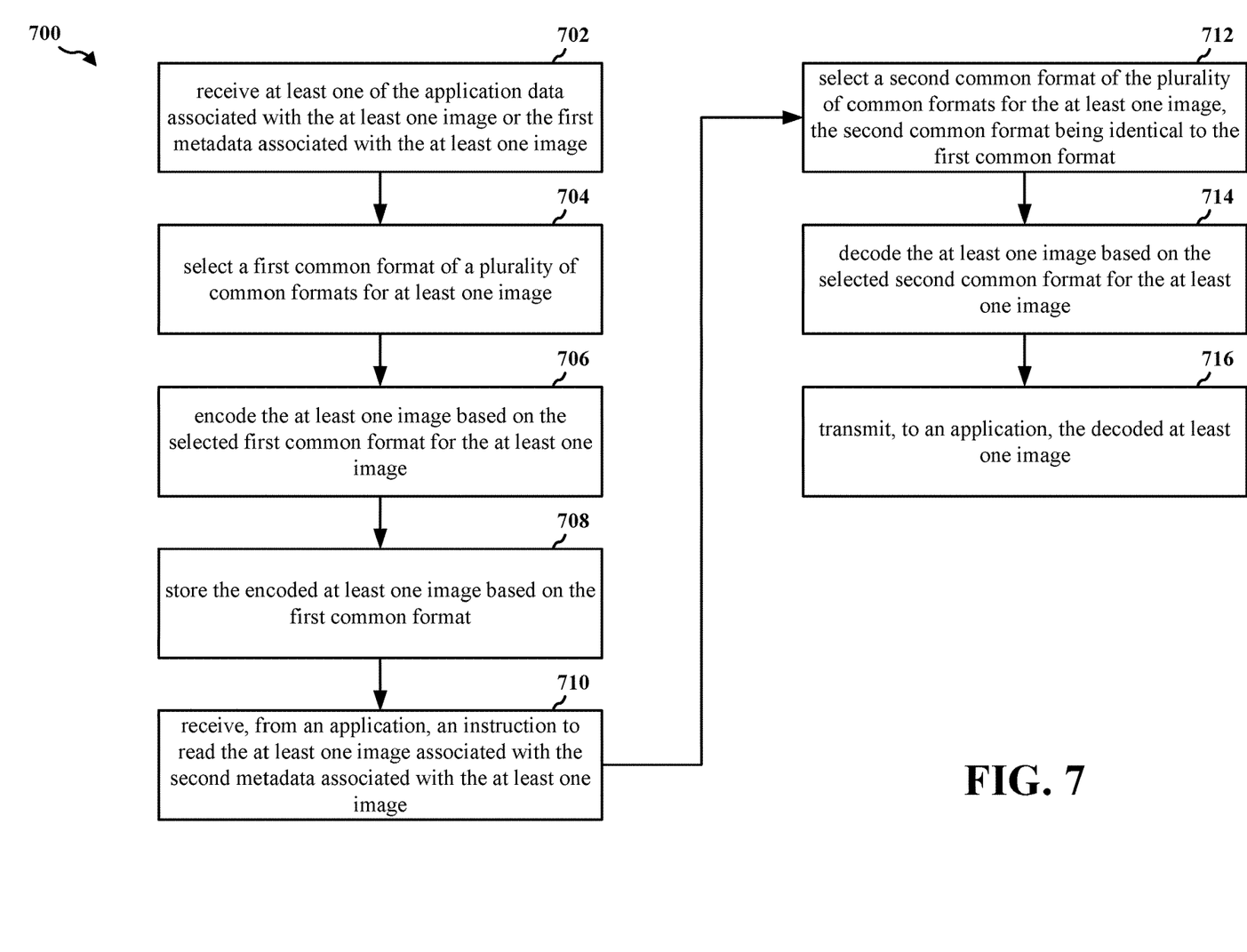
FIG. 7 is a flowchart of an example method of graphics processing in accordance with one or more techniques of this disclosure.

FIG. 7 is a flowchart 700 of an example method of graphics processing in accordance with one or more techniques of this disclosure. The method may be performed by an apparatus, such as an apparatus for graphics processing, a GPU, a CPU, a wireless communication device, and the like, as used in connection with the aspects of FIGS. 1, 2, 4A, 4B, and 5.

At 702, the apparatus may receive at least one of the application data associated with the at least one image or the first metadata associated with the at least one image. For example, referring to FIG. 5, at 508, the GPU 504 may receive at least one of the application data associated with the at least one image or the first metadata associated with the at least one image. Further, the processing unit 120 in FIG. 1 may perform the operation 702.

In one configuration, referring to FIG. 5, the at least one image may be received from the application or generated by the GPU 504.

In one configuration, the first metadata may correspond to at least one of a mutability of the at least one image or an image view of the at least one image.

At 704, the apparatus may select a first common format of a plurality of common formats for at least one image based on at least one of application data associated with the at least one image or first metadata associated with the at least one image. The at least one image may correspond to an uncompressed format. The application data or the first metadata may correspond to a number of bits per pixel for the at least one image. For example, referring to FIG. 5, at 510, the GPU 504 may select a first common format of a plurality of common formats for at least one image based on at least one of application data associated with the at least one image or first metadata associated with the at least one image. Further, the processing unit 120 in FIG. 1 may perform the operation 704.

In one configuration, the number of bits per pixel may correspond to a plurality of samples of a pixel, or the pixel is a super pixel.

In one configuration, the first common format may be at least one of a common compressed format, a common encoding format, or a common metadata format.

At 706, the apparatus may encode the at least one image based on the selected first common format for the at least one image. For example, referring to FIG. 5, at 512, the GPU 504 may encode the at least one image based on the selected first common format for the at least one image. Further, the processing unit 120 in FIG. 1 may perform the operation 706.

In one configuration, referring to FIG. 5, to encode the at least one image based on the selected first common format for the at least one image, the GPU 504 may compress the at least one image based on the selected first common format.

At 708, the apparatus may store the encoded at least one image based on the first common format. For example, referring to FIG. 5, at 514, the GPU 504 may store, to the memory 516, the encoded at least one image based on the first common format. Further, the processing unit 120 in FIG. 1 may perform the operation 708.

At 710, the apparatus may receive, from an application, an instruction to read the at least one image associated with the second metadata associated with the at least one image. For example, referring to FIG. 5, at 516, the GPU 504 may receive, from an application 502, an instruction to read the at least one image associated with the second metadata associated with the at least one image. Further, the processing unit 120 in FIG. 1 may perform the operation 710.

At 712, the apparatus may select a second common format of the plurality of common formats for the at least one image based on second metadata associated with the at least one image. The second common format may be identical to the first common format. For example, referring to FIG. 5, at 518, the GPU 504 may select a second common format of the plurality of common formats for the at least one image based on second metadata associated with the at least one image. Further, the processing unit 120 in FIG. 1 may perform the operation 712.

At 714, the apparatus may decode the at least one image based on the selected second common format for the at least one image. For example, referring to FIG. 5, at 520, the GPU 504 may decode the at least one image based on the selected second common format for the at least one image. Further, the processing unit 120 in FIG. 1 may perform the operation 714.

In one configuration, referring to FIG. 5, to decode the at least one image based on the selected second common format for the at least one image, the GPU 504 may decompress the at least one image based on the selected second common format.

At 716, the apparatus may transmit, to an application, the decoded at least one image. For example, referring to FIG. 5, at 522, the GPU 504 may transmit, to an application 502, the decoded at least one image. Further, the processing unit 120 in FIG. 1 may perform the operation 716.

In one configuration, referring to FIG. 5, the decoded at least one image may be transmitted to the application 502 based on a format associated with the second metadata.

In configurations, a method or an apparatus for graphics processing is provided. The apparatus may be a GPU, a CPU, or some other processor that may perform graphics processing. In aspects, the apparatus may be the processing unit 120 within the device 104, or may be some other hardware within the device 104 or another device. The apparatus may include means for selecting a first common format of a plurality of common formats for at least one image based on at least one of application data associated with the at least one image or first metadata associated with the at least one image. The at least one image may correspond to an uncompressed format. The application data or the first metadata may correspond to a number of bits per pixel for the at least one image. The apparatus may further include means for encoding the at least one image based on the selected first common format for the at least one image. The apparatus may further include means for selecting a second common format of the plurality of common formats for the at least one image based on second metadata associated with the at least one image. The second common format may be identical to the first common format. The apparatus may further include means for decoding the at least one image based on the selected second common format for the at least one image.

In one configuration, the apparatus may further include means for receiving at least one of the application data associated with the at least one image or the first metadata associated with the at least one image. In one configuration, the at least one image may be received from the application or generated by a GPU. In one configuration, the number of bits per pixel may correspond to a plurality of samples of a pixel, or the pixel may be a super pixel. In one configuration, the first metadata may correspond to at least one of a mutability of the at least one image or an image view of the at least one image. In one configuration, the first common format may be at least one of a common compressed format, a common encoding format, or a common metadata format. In one configuration, the apparatus may further include means for storing the encoded at least one image based on the first common format. In one configuration, the apparatus may further include means for receiving, from an application, an instruction to read the at least one image associated with the second metadata associated with the at least one image. In one configuration, the apparatus may further include means for transmitting, to an application, the decoded at least one image. In one configuration, the decoded at least one image may be transmitted to the application based on a format associated with the second metadata. In one configuration, the means for encoding the at least one image based on the selected first common format for the at least one image may be further configured to compress the at least one image based on the selected first common format. In one configuration, the means for decoding the at least one image based on the selected second common format for the at least one image may be further configured to decompress the at least one image based on the selected second common format.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may comprise RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing including at least one processor coupled to a memory and configured to select a first common format of a plurality of common formats for at least one image based on at least one of application data associated with the at least one image or first metadata associated with the at least one image, the at least one image corresponding to an uncompressed format, the application data or the first metadata corresponding to a number of bits per pixel for the at least one image; encode the at least one image based on the selected first common format for the at least one image; select a second common format of the plurality of common formats for the at least one image based on second metadata associated with the at least one image, the second common format being identical to the first common format; and decode the at least one image based on the selected second common format for the at least one image.

Aspect 2 is the apparatus of aspect 1, the at least one processor being further configured to: receive at least one of the application data associated with the at least one image or the first metadata associated with the at least one image.

Aspect 3 is the apparatus of aspect 2 and includes that the at least one image is received from the application or generated by a GPU.

Aspect 4 is the apparatus of any of aspects 1-3 and includes that the number of bits per pixel corresponds to a plurality of samples of a pixel, or the pixel is a super pixel.

Aspect 5 is the apparatus of any of aspects 1-4 and includes that the first metadata corresponds to at least one of a mutability of the at least one image or an image view of the at least one image.

Aspect 6 is the apparatus of any of aspects 1-5 and includes that the first common format is at least one of a common compressed format, a common encoding format, or a common metadata format.

Aspect 7 is the apparatus of any of aspects 1-6, the at least one processor being further configured to: store the encoded at least one image based on the first common format.

Aspect 8 is the apparatus of any of aspects 1-7, the at least one processor being further configured to: receive, from an application, an instruction to read the at least one image associated with the second metadata associated with the at least one image.

Aspect 9 is the apparatus of any of aspects 1-8, the at least one processor being further configured to: transmit, to an application, the decoded at least one image.

Aspect 10 is the apparatus of aspect 9 and includes that the decoded at least one image is transmitted to the application based on a format associated with the second metadata.

Aspect 11 is the apparatus of any of aspects 1-10 and includes that to encode the at least one image based on the selected first common format for the at least one image, the at least one processor is further configured to compress the at least one image based on the selected first common format.

Aspect 12 is the apparatus of any of aspects 1-11 and includes that to decode the at least one image based on the selected second common format for the at least one image, the at least one processor is further configured to decompress the at least one image based on the selected second common format.

Aspect 13 may be combined with aspect 1-12 and includes that the apparatus is a wireless communication device.

Aspect 14 is a method of graphics processing for implementing any of aspects 1-13.

Aspect 15 is an apparatus for graphics processing including means for implementing a method as in any of aspects 1-13.

Aspect 16 is a computer-readable medium storing computer executable code, the code when executed by at least one processor causes the at least one processor to implement a method as in any of aspects 1-13.

Various aspects have been described herein. These and other aspects are within the scope of the following aspects.

What is claimed is:

1. An apparatus for graphics processing, comprising:
a memory; and
at least one processor coupled to the memory and configured to:
select a first common format of a plurality of common formats for at least one image of an uncompressed format different from the plurality of common formats based on at least one of application data associated with the at least one image or first metadata associated with the at least one image, the application data or the first metadata corresponding to a number of bits per pixel for the at least one image;
encode the at least one image based on the selected first common format for the at least one image;
select a second common format of the plurality of common formats for the at least one image based on second metadata associated with the at least one image, the second common format being identical to the first common format; and
decode the at least one image based on the selected second common format for the at least one image.

2. The apparatus of claim 1, the at least one processor being further configured to:
receive at least one of the application data associated with the at least one image or the first metadata associated with the at least one image.

3. The apparatus of claim 2, wherein the at least one image is received from an application or generated by a graphics processing unit (GPU).

4. The apparatus of claim 1, wherein the number of bits per pixel corresponds to a plurality of samples of a pixel, or the pixel is a super pixel.

5. The apparatus of claim 1, wherein the first metadata corresponds to at least one of a mutability of the at least one image or an image view of the at least one image.

6. The apparatus of claim 1, wherein the first common format is at least one of a common compressed format, a common encoding format, or a common metadata format.

7. The apparatus of claim 1, the at least one processor being further configured to:
store the encoded at least one image based on the first common format.

8. The apparatus of claim 1, the at least one processor being further configured to:
receive, from an application, an instruction to read the at least one image associated with the second metadata associated with the at least one image.

9. The apparatus of claim 1, the at least one processor being further configured to:
transmit, to an application, the decoded at least one image.

10. The apparatus of claim 9, wherein to transmit the decoded at least one image, the at least one processor is configured to transmit the decoded at least one image to the application based on a format associated with the second metadata.

11. The apparatus of claim 1, wherein to encode the at least one image based on the selected first common format for the at least one image, the at least one processor is further configured to compress the at least one image based on the selected first common format.

12. The apparatus of claim 1, wherein to decode the at least one image based on the selected second common format for the at least one image, the at least one processor is further configured to decompress the at least one image based on the selected second common format.

13. The apparatus of claim 1, wherein the apparatus is a wireless communication device.

14. A method of graphics processing, comprising:
selecting a first common format of a plurality of common formats for at least one image of an uncompressed format different from the plurality of common formats based on at least one of application data associated with the at least one image or first metadata associated with the at least one image, the application data or the first metadata corresponding to a number of bits per pixel for the at least one image;
encoding the at least one image based on the selected first common format for the at least one image;
selecting a second common format of the plurality of common formats for the at least one image based on second metadata associated with the at least one image, the second common format being identical to the first common format; and
decoding the at least one image based on the selected second common format for the at least one image.

15. The method of claim 14, further comprising:
receiving at least one of the application data associated with the at least one image or the first metadata associated with the at least one image.

16. The method of claim 15, wherein the at least one image is received from an application or generated by a graphics processing unit (GPU).

17. The method of claim 14, wherein the number of bits per pixel corresponds to a plurality of samples of a pixel, or the pixel is a super pixel.

18. The method of claim 14, wherein the first metadata corresponds to at least one of a mutability of the at least one image or an image view of the at least one image.

19. The method of claim 14, wherein the first common format is at least one of a common compressed format, a common encoding format, or a common metadata format.

20. The method of claim 14, further comprising:
storing the encoded at least one image based on the first common format.

21. The method of claim 14, further comprising:
receiving, from an application, an instruction to read the at least one image associated with the second metadata associated with the at least one image.

22. The method of claim 14, further comprising:
transmitting, to an application, the decoded at least one image.

23. The method of claim 22, wherein the decoded at least one image is transmitted to the application based on a format associated with the second metadata.

24. The method of claim 14, wherein encoding the at least one image based on the selected first common format for the at least one image further comprises compressing the at least one image based on the selected first common format.

25. The method of claim 14, wherein decoding the at least one image based on the selected second common format for the at least one image further comprises decompressing the at least one image based on the selected second common format.

26. A computer-readable medium storing computer executable code, the code when executed by at least one processor, causes the at least one processor to:
select a first common format of a plurality of common formats for at least one image of an uncompressed format different from the plurality of common formats based on at least one of application data associated with the at least one image or first metadata associated with the at least one image, the application data or the first metadata corresponding to a number of bits per pixel for the at least one image;
encode the at least one image based on the selected first common format for the at least one image;
select a second common format of the plurality of common formats for the at least one image based on second metadata associated with the at least one image, the second common format being identical to the first common format; and
decode the at least one image based on the selected second common format for the at least one image.

27. The computer-readable medium of claim 26, the code further causing the at least one processor to:
receive at least one of the application data associated with the at least one image or the first metadata associated with the at least one image.

28. The computer-readable medium of claim 27, wherein the at least one image is received from an application or generated by a graphics processing unit (GPU).

29. The computer-readable medium of claim 26, wherein the number of bits per pixel corresponds to a plurality of samples of a pixel, or the pixel is a super pixel.

30. The computer-readable medium of claim 26, wherein the first metadata corresponds to at least one of a mutability of the at least one image or an image view of the at least one image.

* * * * *